United States Patent [19]

Wang et al.

[11] Patent Number: 5,313,279
[45] Date of Patent: May 17, 1994

[54] DIGITAL CARRIER COMBINING APPARATUS IN A MULTIPLE QAM DIGITAL TELEVISION SIGNAL RECEIVER

[75] Inventors: Tian J. Wang; Lauren A. Christopher, both of Indianapolis, Ind.

[73] Assignee: Thomson Consumer Electronics, Indianapolis, Ind.

[21] Appl. No.: 991,625

[22] Filed: Dec. 16, 1992

[30] Foreign Application Priority Data

Sep. 10, 1992 [GB] United Kingdom ............ 9219185.7

[51] Int. Cl.⁵ .................... H04N 7/12; H04N 7/00
[52] U.S. Cl. .................... 348/426; 348/469
[58] Field of Search .............. 358/12, 141, 142, 133, 358/11; 375/39; H04N 7/00, 7/08, 7/12

[56] References Cited

U.S. PATENT DOCUMENTS

| | | | |
|---|---|---|---|
| 5,053,860 | 10/1991 | Tsinberg | 358/12 |
| 5,055,927 | 10/1991 | Keesen et al. | 358/141 |
| 5,087,970 | 2/1992 | Cavallerno | 358/141 |
| 5,111,292 | 5/1992 | Kuriacose et al. | 358/141 |
| 5,122,875 | 6/1992 | Raychaudhuri et al. | 358/133 |
| 5,134,464 | 7/1992 | Basile | 358/12 |
| 5,148,272 | 9/1992 | Acampora et al. | 358/141 |
| 5,168,356 | 12/1992 | Acampora et al. | 358/141 |
| 5,184,219 | 2/1993 | Cho | 358/141 |
| 5,231,384 | 7/1993 | Kuriacose | 358/141 |
| 5,231,486 | 7/1993 | Acampora et al. | 358/141 |

FOREIGN PATENT DOCUMENTS 496577 7/1992 United Kingdom .......... H04N 7/00

OTHER PUBLICATIONS

Spread Spectrum Television Broadcasting, by W. F. Schreiber, SMPTE Journal, Aug. 1992, pp. 538-549.
A VLSI Architecture for a High-Speed All-Digital Quadrature Modulator and Demodulator for Digital Ratio Applications by H. Samueli et al., IEEE Journal on Selected Areas in Communications, vol. 8, No. 8, Oct. 1990.

*Primary Examiner*—James J. Groody
*Assistant Examiner*—Chris Grant
*Attorney, Agent, or Firm*—Joseph S. Tripoli; Eric P. Herrmann; Ronald H. Kurdyla

[57] ABSTRACT

In a high definition television signal encoder, high priority and standard priority digital data are each separated into quadrature I and Q components, spectrally shaped by digital filtering, and time division multiplexed to produce respective quadrature amplitude modulated signals of the 32-QAM type. The high priority QAM signal and the standard priority QAM signal exhibit different bandwidths and carrier frequencies. The high priority and standard priority QAM signals are combined in digital form to produce a prioritized dual 32-QAM digital signal before being conveyed to a single analog-to-digital converter and analog RF transmission networks.

9 Claims, 4 Drawing Sheets

DIGITAL CARRIER COMBINING APPARATUS IN A MULTIPLE QAM DIGITAL TELEVISION SIGNAL RECEIVER

FIELD OF THE INVENTION

This invention concerns a digital high definition television (HDTV) signal encoding system using multiple quadrature amplitude modulated (QAM) signals. In particular, this invention concerns a prioritized dual carrier QAM encoding system of the type described in U.S. patent application Ser. No. 650,329 of H. E. White filed Feb. 4, 1991, and in U.S. Pat. No. 5,122,875—Raychaudhuri et al. issued Jun. 16, 1992.

BACKGROUND OF THE INVENTION

In a QAM symbol transmission system of the type disclosed, a transmitted data symbol is represented by both "I" and "Q" quadrature components which modulate respective quadrature phased carriers. Each symbol may comprise several bits, and the number of symbols dictates the type of QAM system, i.e., 16-QAM, 32-QAM, etc. Each symbol is mapped (assigned) to a prescribed location in a four-quadrant grid-like constellation using a look-up table (e.g., a ROM). A prescribed number of symbols occupy assigned areas in each quadrant. In a 32-QAM system, each quadrant of the constellation contains eight symbols at prescribed coordinates with respect to quadrature I and Q axes. Certain symbol bits designate the constellation quadrant in which a symbol is located, and certain bits designate the particular coordinate in that quadrant assigned to the symbol. QAM systems of this general type are well known.

White and Raychaudhuri et al. describe aspects of a system wherein a television signal representing high definition image information is transmitted using two QAM carriers frequency multiplexed in a standard 6 MHz television transmission baseband. One of the carriers conveys high priority information, while the other carrier conveys (relatively lower) standard priority information. The high priority (HP) information is the information needed to create a viewable image, although less than a perfect image, and is conveyed with significantly more power than the standard priority (SP) information, which is the remaining information. The high priority information exhibits a narrow bandwidth compared to the standard priority information, and is therefore much less prone to corruption by the transmission channel. The HP carrier is located in that portion of the frequency spectrum of a television transmission channel, e.g., an NTSC channel, which is normally occupied by the vestigial sideband of a standard NTSC television signal. This portion of the signal is normally significantly attenuated by the Nyquist filters of standard receivers, so that HDTV signals with this transmission format will not introduce co-channel interference.

A straightforward approach to encoding such a dual QAM signal is to use two parallel paths for encoding and modulating two QAM signals independently. After the two encoded QAM signals have been converted from digital to analog format, two frequency translators merge the encoded QAM signals into a composite dual QAM signal with carriers situated at appropriate spectral locations. In accordance with the principles of the present invention, an illustrative system encodes a prioritized multiple carrier QAM HDTV signal so as to reduce circuit complexity and production costs, e.g., by reducing overall circuit size and integrated circuit surface area in particular, without compromising the quality of an encoded QAM signal.

SUMMARY OF THE INVENTION

In accordance with the principles of the present invention, high priority and standard priority Quadrature Amplitude Modulated signals constituting an HDTV signal are merged in the digital domain before being converted to analog form. Consequently, only one digital-to-analog converter and analog network are needed to generate an analog multiple QAM signal for RF transmission.

In a disclosed preferred embodiment of the invention, high priority (HP) and standard priority (SP) signals are spectrally shaped by respective digital filters before being QAM modulated. The QAM modulated HP and SP components are combined by a digital processor, including a digital adder and interpolator, before being conveyed to a single analog-to-digital converter and associated analog network for RF transmission.

DETAILED DESCRIPTION

Before discussing the system shown in FIG. 1, it will be helpful to consider FIG. 3, which depicts the frequency spectrum of a prioritized dual 32-QAM baseband video signal produced by the disclosed system as will be discussed.

Figure 3:
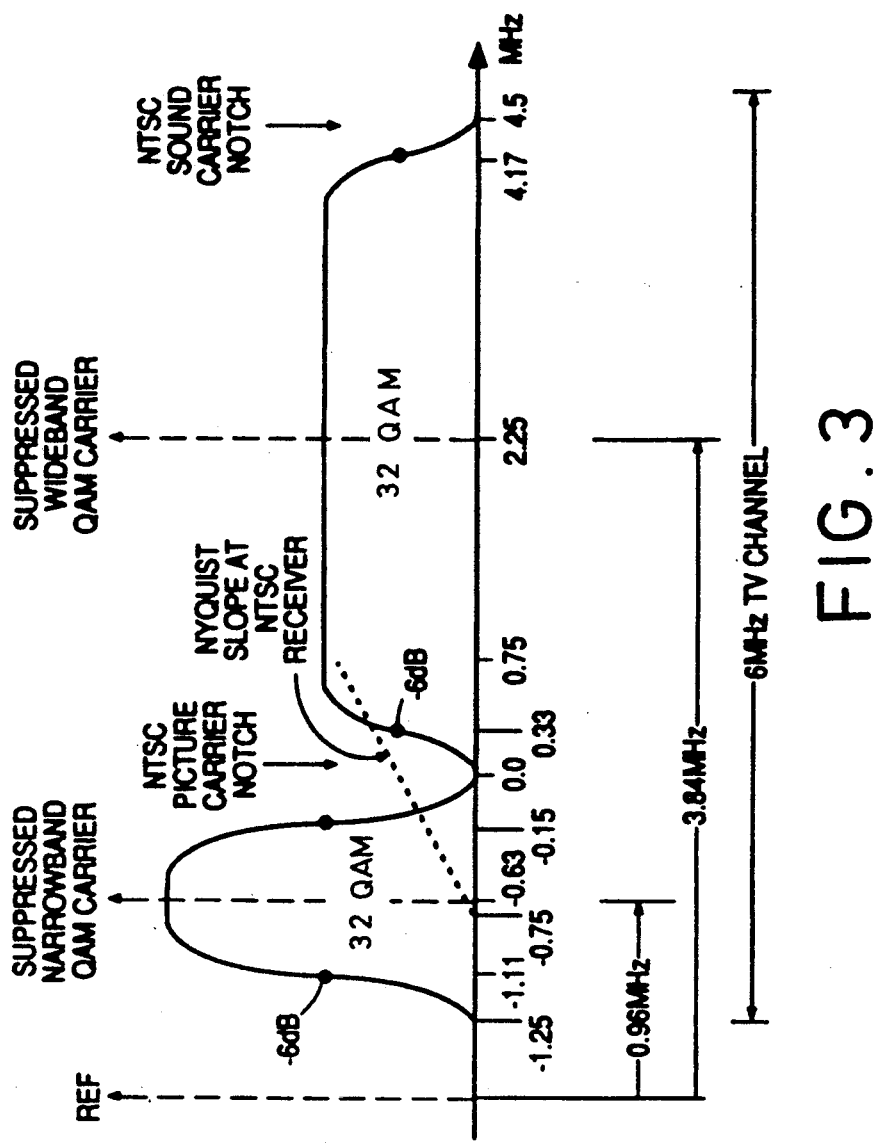
FIG. 3 depicts the video frequency spectrum of a dual QAM high definition television signal developed by the system of FIG. 1.

FIG. 3 illustrates the video frequency spectrum of a high definition television signal which is compatible with the 6 MHz bandwidth of a standard NTSC television signal channel. To facilitate comparison with a standard NTSC video frequency spectrum, the frequencies along the frequency scale of FIG. 3 ($-1.25$ MHz to 4.5 MHz) are referenced to the 0.0 MHz frequency location of the RF picture carrier in an NTSC system.

The HDTV signal is a data compressed signal divided into high and low priority components. In this example audio, synchronizing and low frequency video information components which are intended to be received with high reliability are assigned a high priority. The synchronizing information, for example, may be in the nature of a training signal containing a unique signature or code to facilitate signal recovery and processing at a receiver, and illustratively may include field rate scanning information (e.g., start of field markers). Other less critical components, such as high frequency video information, are assigned a lower priority. The high priority information exhibits a narrow bandwidth relative to the low priority information, and quadrature amplitude modulates (QAM) a 0.96 MHz first suppressed carrier referenced to a signal REF as discussed below. The low priority information quadrature amplitude modulates a 3.84 MHz second suppressed carrier which is also referenced to signal REF. A resulting composite signal is a form of a multiple QAM signal, i.e., a "dual" QAM signal in this instance. The composite dual QAM signal is translated into the 6 MHz standard television band by means of out-of-band reference signal REF. The frequency of signal REF is chosen so that when signal REF is modulated by the composite QAM signal, one of the resulting sum or difference components falls within the band of frequencies associated with a desired radio frequency television channel, such as simulcast VHF channel 3. Signal REF is modulated by the composite dual QAM signal to produce a double sideband modulated signal, the lower sideband of which is rejected and the upper sideband of which is retained as illustrated by FIG. 3.

The amplitude of the narrowband HP QAM component is significantly greater than that of the wideband SP component, e.g., twice as large. The $-6$ db bandwidth of the HP component is 0.96 MHz, and the $-6$ db bandwidth of the SP component is 3.84 MHz, which is four times the bandwidth of the HP component. The nonlinear band edge transition regions of the narrowband HP and wideband SP components are shaped by finite impulse response (FIR) filters with a square root of a raised cosine characteristic, to produce smooth transition regions which avoid unwanted high frequency effects produced by sharp transition regions. The amplitude-versus-frequency response of the wideband SP component in the band edge transition regions (not drawn to scale) has one quarter the slope of the steeper narrowband HP component.

The HP and SP QAM signals each comprise quadrature "I" and "Q" components. A 32-QAM system processes five bit data words, or symbols. Eight-symbols are disposed in each of four QAM constellation quadrants defined by I and Q axes. Each symbol is located at a prescribed constellation coordinate. Two bits of each symbol designate the constellation quadrant for that symbol, and three bits designate the coordinate for the symbol in the quadrant.

The 32-QAM system to be discussed exhibits symbol rates of 0.96 MHz and 3.84 MHz for the HP and SP data, respectively. The symbol rate is independent of the type of QAM processing being used (e.g., 16-QAM or 32-QAM). Using four times sampling of the symbol rate, the HP sampling rate is 3.84 MHz and the SP sampling rate is 15.36 MHz. At five bits per symbol in the case of 32-QAM, the HP and SP bit rates are 4.8 Mbps and 19.2 Mbps, respectively.

The described prioritized dual QAM system exhibits significant co-channel immunity from interference associated with a standard NTSC television signal, i.e., an NTSC signal transmitted from a different location in the same channel as the dual QAM signal. This is due to attenuating notches in the QAM spectrum in the vicinity of the NTSC RF picture carrier and the NTSC sound carrier, which are associated with high energy information. Conversely, co-channel interference from the dual QAM signal into an NTSC signal is significantly reduced because the large amplitude narrowband QAM signal will be significantly attenuated by a Nyquist slope filter in a standard NTSC television receiver. In FIG. 3 the Nyquist slope filter response in a standard NTSC receiver is indicated by a dotted line superimposed on the low band portion of the QAM spectrum from $-0.75$ MHz to 0.75 MHz. The combination of the 6 db greater amplitude of the narrowband QAM component and its one-quarter bandwidth relative to the wideband QAM component results in a significantly greater power density than that of the wideband QAM component. The illustrated high priority narrowband QAM signal therefore exhibits a significant signal-to-noise improvement and lower error rate relative to the low priority wideband QAM signal.

The large peak amplitude narrowband component contains video information sufficient to produce a displayed image with definition approximating that of a standard definition television image. Thus a viewer should not be overly disturbed if, for example, the high definition transmission is momentarily disrupted by aircraft flutter. That is, if the low power wideband component containing the high definition information is disrupted momentarily, the high power narrowband component may be unaffected whereby a lower definition but acceptable image is displayed momentarily.

The sampling rates of the SP and HP QAM signals, 15.36 MHz and 3.84 MHz respectively, advantageously exhibit a 4:1 integer relationship. This relationship simplifies recovering the narrowband and wideband QAM information at a receiver, since the same derived data clock can readily be used for timing the data recovery operation of both QAM components. The required data clock rates for the receiver system can be easily derived from the readily recovered high power narrowband QAM signal.

Figure 1:
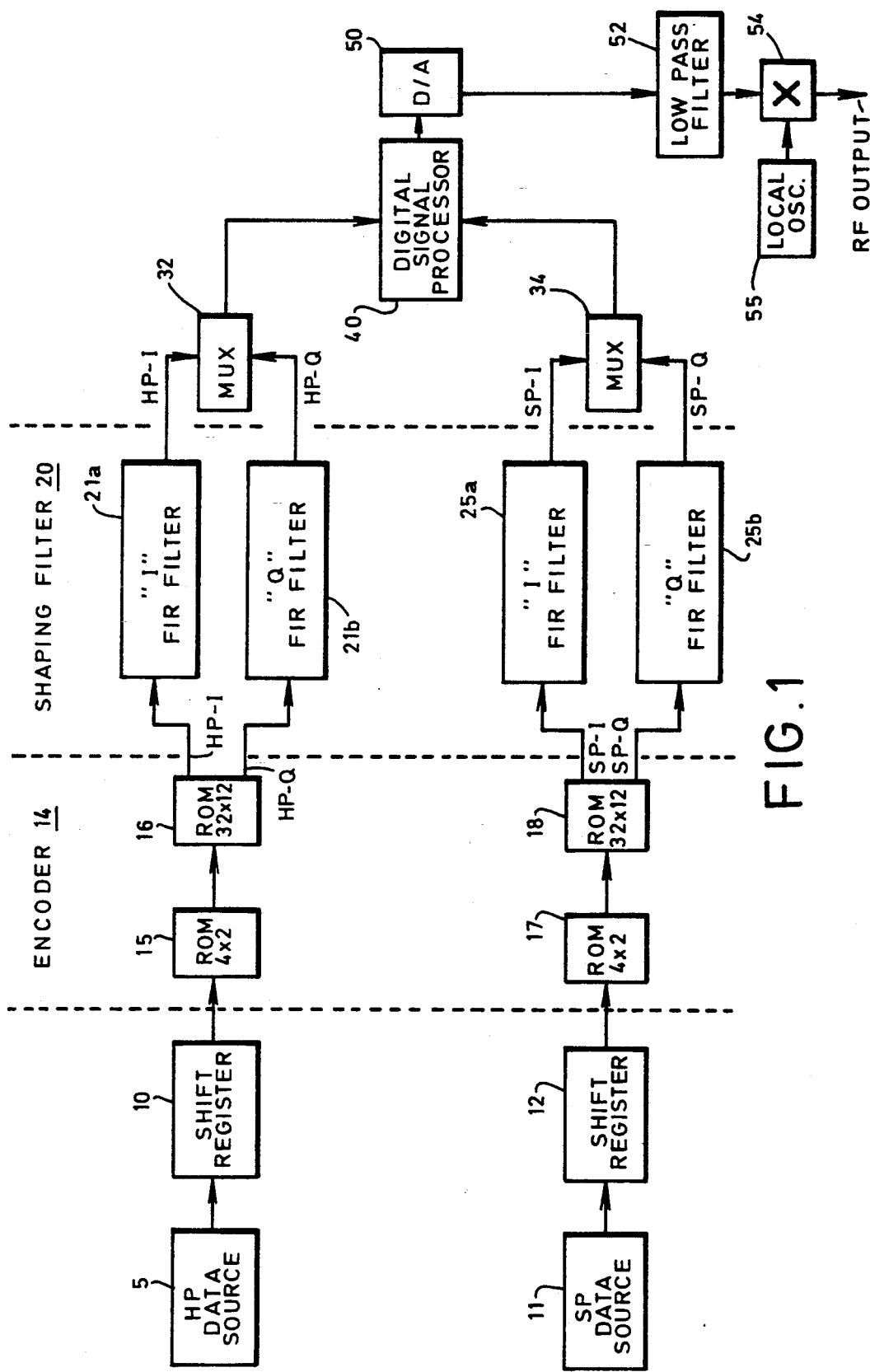
FIG. 1 is a block diagram of a digital HDTV QAM encoding system in accordance with the principles of the present invention.

In FIG. 1, high priority (HP) data from a source 5 and standard priority (SP) data from a source 11 are processed in respective high priority and standard priority signal paths before being combined by a digital signal processor 40. The HP and SP data provided by sources 5 and 11 may be developed as disclosed in U.S. Pat. No. 5,122,875—Raychaudhuri et al. Since the HP and SP signal processing paths between the data sources and unit 40 are structurally and operationally similar, only the HP processing path will be described in detail.

FIG. 1 depicts a digital dual 32-QAM encoding system which is advantageously fabricated as an integrated circuit. Digital signal processor 40, which is shown in greater detail in FIG. 2, merges HP and SP QAM signals in the digital domain so that only one digital-to-analog converter and one analog network are needed to generate an analog dual QAM signal for RF transmission.

The HP data stream from source 5 is converted from serial to 5-bit parallel form by shift register 10. The output from shift register 10 is applied to an encoder section 14 including ROM (Read Only Memory) units 15 and 16. Encoder 14 is used in accordance with conventional QAM encoding practice to facilitate decoding at a receiver. Specifically, the encoding provided by section 14 enhances receiver insensitivity to phase rotation of a received QAM constellation.

Unit 15 including an internal accumulator and look-up table has a 5-bit parallel input and a 5-bit parallel output. This ROM passes the last three bits (which specify the symbol coordinate) of each 5-bit symbol without processing, but examines the first two symbol bits which specify the quadrant. The accumulator accumulates the first two bits of the current symbol and the first two bits of the previous symbol. The look-up table provides a 2-bit output value representing the difference between these current and previous first two bits. The difference representative bits act as a reference for correctly identifying the QAM quadrants at a receiver. These bits are passed to the output of unit 15, where they are combined with the associated last three bits to reconstitute the 5-bit symbol.

ROM 16 acts as a data mapper for the continuous 5-bit parallel data stream from ROM 15. ROM 16 splits its input data stream into sequential 5-bit symbols. Using a look-up table, each 5-bit symbol is mapped into a four quadrant grid-like constellation defined by quadrature I and Q axes. In a 32-QAM system, eight 5-bit symbols occupy assigned areas in each quadrant. The first two bits of each symbol designate the quadrant in which the symbol is located with respect to the I and Q quadrature axes, and the remaining three bits designate the specific location (coordinate) assigned to the symbol within that quadrant. The next symbol is processed similarly. ROM 16 has two parallel outputs at which data words appear alternately. Alternating processed symbols are nominally designated as I and Q symbols, and respectively appear at the parallel I and Q outputs of ROM 16. For additional information concerning coding of the type performed by section 14, refer to the CCITT V.29 and V.32 standard.

ROM 16 provides HP I and Q output symbols in parallel form to digital filters 21a and 21b, respectively. These filters are 20-tap (20 coefficient) Finite Impulse Response (FIR) square root raised cosine digital low pass spectral shaping filters, clocked at the 3.84 MHz high priority sampling rate. Counterpart shaping filters 25a and 25b in the standard priority path are clocked at the 15.36 MHz sampling rate of the standard priority component. The shaping filters are used in accordance with conventional QAM signal processing practice to define the shape of the excess bandwidth response, i.e., the steepness of the bandedge slope, of the I and Q components. The excess bandwidth is approximately 17 percent in this example.

Filtered HP I and HP Q output signals from filters 214 and 21b are time multiplexed by means of a multiplexer 32. As will be explained subsequently, filters 21a and 21b cooperate with Mux 32 to develop a Quadrature Amplitude Modulated HP component, i.e., a 32-QAM HP component. The 32-QAM HP signal from unit 32 and a 32-QAM SP signal from counterpart Mux 34 in the standard priority path are processed by digital signal processor 40 to produce a single data stream (as will be discussed in connection with FIG. 2) before being converted from digital to analog form by means of D/A converter 50. The output signal from converter 50 is low pass filtered by analog filter 52 before modulating a signal from local oscillator 55 in a modulator 54 to produce an output signal suitable for RF transmission. Filter 52 limits the output signal to the standard television channel bandwidth (6 MHz in the case of NTSC), and eliminates high frequency components such as harmonics associated with preceding digital signal processing. The baseband spectrum of the prioritized dual 32-QAM signal to be transmitted is of the form shown in FIG. 3.

The process by which a digital filter (such as filters 21a and 21b in section 20) and a digital multiplexer (such as Mux 32) coact to produce digital Quadrature Amplitude Modulation is discussed by Samueli et al. in an article "A VLSI Architecture for a High-Speed All-Digital Quadrature Modulator and Demodulator for Digital Radio Applications," *IEEE Journal on Selected Areas in Communications*, Vol. 8, No. 8, October 1990. Shaping filters 21a and 21b and output Mux 32 in the HP path essentially operate as sine/cosine carrier generators and mixers. The sampling rate of the shaping filters and of the output Mux in the HP path, and the sampling rate of the counterpart elements in the SP path, respectively establish the QAM HP and SP carrier frequencies. The sampling rate is four times the carrier frequency, and the carrier frequency equals the symbol rate.

By choosing the carrier frequency equal to the symbol rate, i.e., one-quarter the sampling rate, the cosine and sine waveform values needed for the mixing function can be obtained by sampling at 0, 90, 180 and 270 degrees. Such sampling produces values of 1, 0, −1, 0 for the cosine function, and values of 0, 1, 0, −1 for the sine function. A 2:1 multiplexer (such as Mux 32) and an inverter can perform the modulator mixing function. The inverter needed to perform the −1 multiplication in the mixing process can be implemented by assigning a negative sign to half of the shaping filter coefficients.

Figure 2:
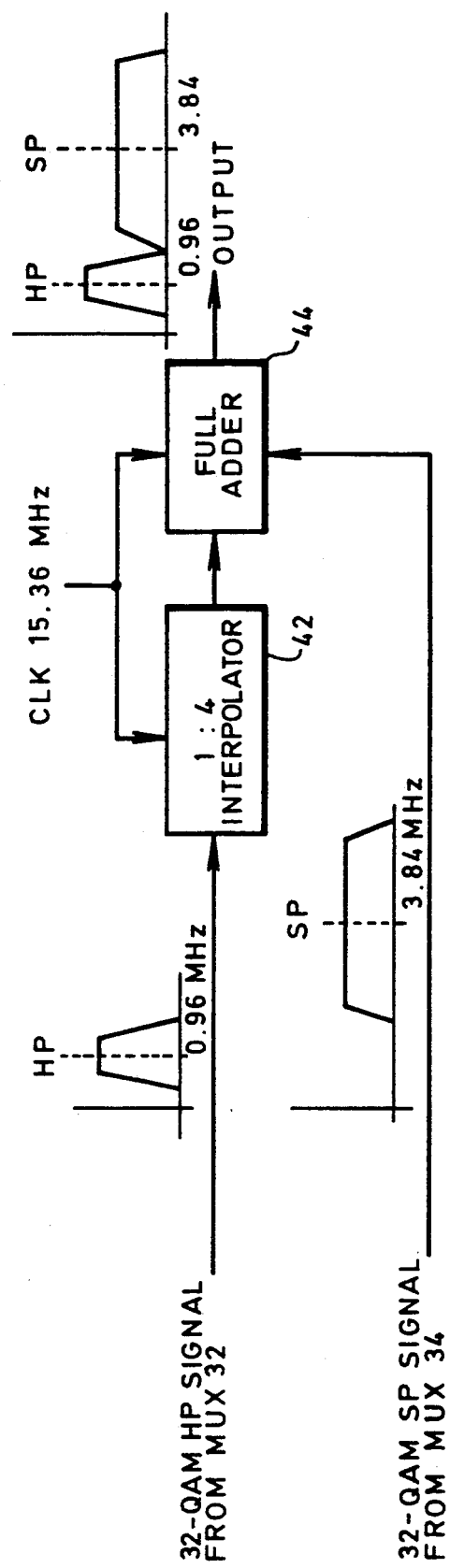
FIG. 2 shows details of a portion of the FIG. 1 system.

FIG. 2 illustrates additional details of digital signal processor 40 in FIG. 1. One input of processor 40 is the narrowband, relatively high energy 32-QAM HP component with a frequency spectrum centered at 0.96 MHz and a sampling rate of 3.84 MHz, (4×0.96 MHz). This signal is applied to a 1:4 interpolator 42 which upsamples to 15.36 MHz. This action of interpolator 42 converts the narrowband HP data from a 3.84 MHz data rate to a 15.36 MHz data rate so that the HP data from Mux 32 and the SP data from Mux 34 have the same data rate and can be combined properly in the digital time domain by digital full adder 44. This data rate conversion is facilitated by the 4:1 integer relationship between the bandwidths and carrier frequencies of the SP and HP QAM signals. Adder 44 is clocked at 15.36 MHz and receives the 32-QAM SP signal from Mux 34 directly. The relative power levels, i.e., amplitudes, of the HP and SP signals are readily and accurately maintained in the digital domain such as by appropriate programming of the preceding ROM stages of encoder section 14, or by programming the coefficient values of the filters in shaping filter section 20. The dual QAM digital output signal from adder 44 is applied to a single digital-to-analog converter (50 in FIG. 1) to produce a dual QAM analog signal for RF transmission.

The number of filters used in shaping filter section 20 can be reduced in half by using a multiplexing technique as disclosed in copending U.S. patent application Ser. No. 921,790 of Lauren Christopher titled "FIR Filter Apparatus For Multiplexed Processing of Time Division Multiplexed Signals," filed Jul. 29, 1992, and in a copending U.S. patent application Ser. No. 922,104 of Lauren Christopher titled "Apparatus For Time Division Multiplexed Processing of Plural QAM Signals," filed Jul. 29, 1992. Such an FIR filter for multiplexed processing of time multiplexed signal is illustrated generally by FIG. 4.

Figure 4:
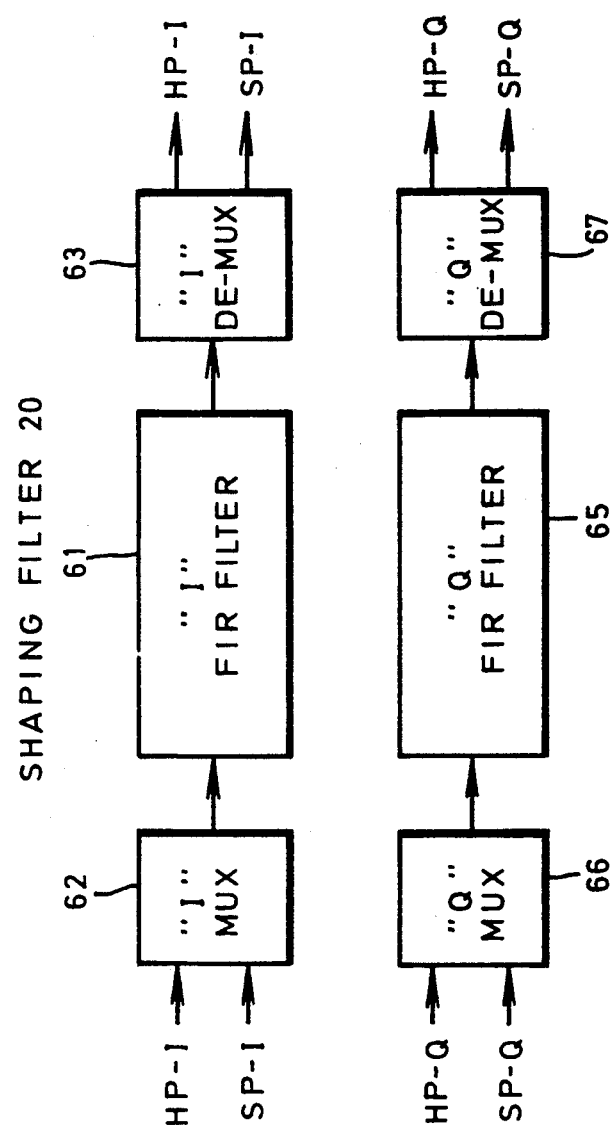
FIG. 4 shows an alternative arrangement of a digital filter portion of the FIG. 1 system.

In FIG. 4, shaping filter section 20 includes multiplexed I and Q filters 61 and 65. Each is preceded by respective input time multiplexers 62 and 66, and followed by output time demultiplexers 63 and 67, respectively. Input HP-I and HP-Q components are provided by ROM 16 in FIG. 1, and input SP-I and SP-Q components are provided by ROM 17 in FIG. 1. Output HP-I and HP-Q components are applied to output Mux 32 in FIG. 1, and output SP-I and SP-Q components are applied to output Mux 34 in FIG. 1. The following description of multiplexed filter 61 for I sample processing also applies to filter 65 for Q sample processing.

For every I (or Q) sample in the HP component, there are four I (or Q) samples in the SP component. Input Mux 62 therefore time division multiplexes HP and SP I samples at a ratio of four SP I samples to one HP I sample, and couples the resulting signal to multiplexed filter 61. Filter 61 is arranged to operate in time multiplexed fashion to reduce hardware requirements. Filter 61 is an input weighted FIR filter with an input bus for receiving the multiplexed samples from unit 62. These samples are applied to each of a plurality of weighting circuits where they are weighted by respective coefficients. Weighted samples from respective weighting circuits are coupled to respective adders, which adders are interconnected by delay stages. The delay stages are clocked at the sample rate to successively process the applied samples, and provide a filtered signal at the filter output at the last delay stage. Since the samples occur in the sequence SP, SP, SP, SP, BP, SP, SP, SP, SP, HP etc., SP delay stages are enabled or clocked when SP samples appear, and HP delay stages are enabled when HP samples appear. Thus HP samples are filtered independent of SP samples. Each time a particular sample type (HP or SP) is applied to the input, only those delay stages storing like-type samples are interconnected between adder circuits, forming a filter operative on only that type sample. That is, when SP (HP) samples are applied to the input, delay stages associated with HP (SP) samples are effectively removed from the circuit, although the information in them is retained. The filter exhibits two sets of coefficients which are switchable depending upon the type of input sample. Thus the filter provides different transfer functions for the different HP, SP samples by using different coefficents for the different sample types. One set of coefficients is applied to the weighting circuits when HP samples are present, and the other coefficient set is applied to the weighting circuits when SP samples are present, in response to a coefficient control signal. The output of filter 61 is a time division multiplexed signal wherein individual HP I and SP I components are independently filtered.

What is claimed is:

1. In a system for processing a high definition television signal, apparatus comprising:
   means for providing a first digital signal representing first information and having quadrature components;
   means for providing a second digital signal representing second information and having quadrature components;
   first digital signal processing means responsive to said first and second digital signals for providing a first carrier quadrature amplitude modulated (QAM) with said first information and having a first data rate, and a second carrier quadrature amplitude modulated with said second information and having a second data rate different from said first data rate; and
   second digital signal processing means including means for converting said first data rate of said first modulated carrier to said second data rate of said second modulated carrier to produce a data rate converted modulated first carrier, and means for combining said data rate converted modulated first carrier and said modulated second carrier, in digital form, to produce a composite multiple QAM carrier output signal.

2. Apparatus according to claim 1, wherein
said first and second QAM carriers exhibit different carrier frequencies and different bandwidths occupying different portions of a television signal video spectrum.

3. Apparatus according to claim 1 wherein
said first QAM carrier exhibits a narrow bandwidth relative to said second QAM carrier and said first QAM carrier exhibits a carrier frequency having an integer relationship to a carrier frequency of said second QAM carrier.

4. Apparatus according to claim 1 and further including
digital-to-analog converter means for converting said multiple QAM output signal from digital to analog form; and
analog signal transmission means for receiving an analog output signal from said converter means.

5. Apparatus according to claim 1, wherein said first digital signal processing means includes
digital filter means for spectrally shaping said first and second digital signals; and
multiplexing means responsive to output signals from said filter means for time division multiplexing filtered first information quadrature components to provide said first QAM carrier at an output, and for time division multiplexing filtered second information quadrature components to provide said second QAM carrier at an output.

6. Apparatus according to claim 1, wherein said second digital signal processing means comprises interpolator means for converting said first data rate of said first QAM carrier; and
digital adder means responsive to an output signal from said interpolator means and to said second QAM carrier for producing said composite multiple QAM output signal.

7. Apparatus according to claim 1, wherein
said multiple QAM output signal is a multiple 32-QAM output signal.

8. Apparatus according to claim 1, wherein
said first information modulating said first carrier exhibits a higher priority than said second information modulating said second carrier.

9. Apparatus according to claim 1, wherein
said first and second data rates exhibit an integer relationship.

* * * * *